United States Patent [19]
Callerame

[11] Patent Number: 4,874,489
[45] Date of Patent: Oct. 17, 1989

[54] PROCESS FOR THE PRODUCTION OF CHLORINE DIOXIDE

[76] Inventor: Joseph Callerame, 2220 Casper Dr., Lake Havasu City, Ariz. 86403

[21] Appl. No.: 217,385

[22] Filed: Jul. 11, 1988

[51] Int. Cl.$^4$ ............................................. C01B 11/02
[52] U.S. Cl. .......................... 204/157.44; 204/157.48; 204/903; 204/904; 423/477
[58] Field of Search .................. 423/477; 204/157.44, 204/157.48, 903, 904

[56] References Cited

U.S. PATENT DOCUMENTS

| | | | |
|---|---|---|---|
| 3,056,270 | 10/1962 | Grubitsch | 423/477 |
| 4,414,180 | 11/1983 | Fisher | 204/157.48 |
| 4,456,511 | 6/1984 | Fisher | 204/157.48 |

Primary Examiner—John Doll
Assistant Examiner—Jeffrey Edwin Russel
Attorney, Agent, or Firm—Toren, McGeady & Associates

[57] ABSTRACT

Chlorine dioxide is produced by subjecting a chlorite to ultraviolet radiation. The source for chlorite may be an aqueous solution of an alkali metal or alkaline earth metal chlorite. Chloride ions and/or hydrogen ions may be added to the solution.

10 Claims, 1 Drawing Sheet

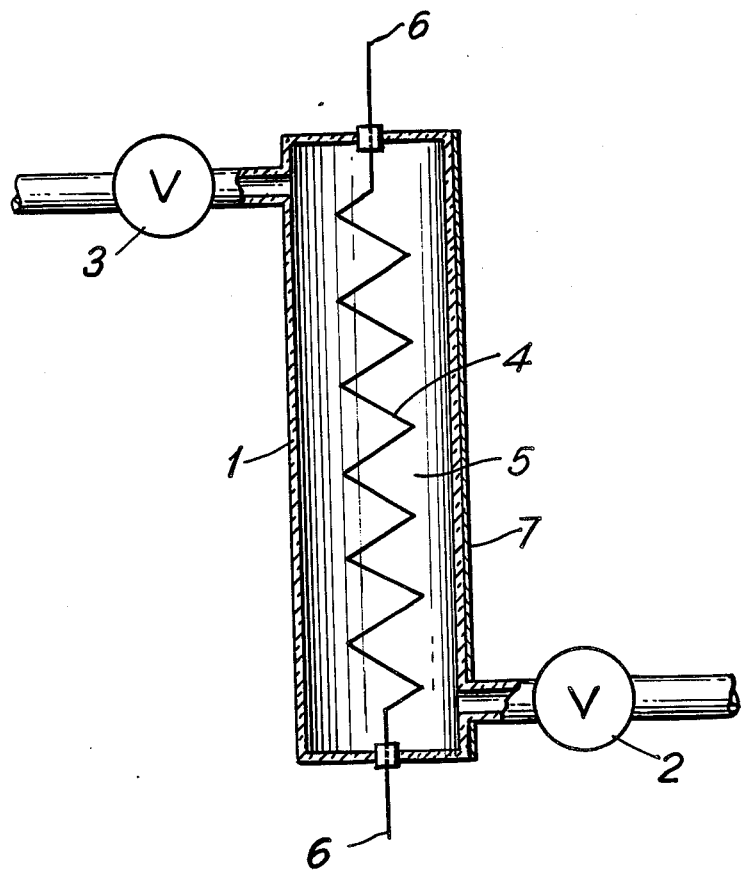

PROCESS FOR THE PRODUCTION OF CHLORINE DIOXIDE

FIELD OF THE INVENTION

The present invention relates generally to chlorine dioxide and is particularly directed to a process of producing chlorine dioxide from readily available raw materials.

BACKGROUND INFORMATION AND PRIOR ART

Chlorine dioxide is of considerable industrial importance and has found use as a disinfectant and in the bleaching of wood pulp, fats, oils and flour. Generally, chlorine dioxide is used as a bleaching agent and for removing tastes and odors from water and the like liquids. More recently, it has been used as an anti-pollutant.

For several of the established uses of the chlorine dioxide, it is desirable to produce the gas in situ so that the chlorine dioxide, upon formation, can be directly put to use either in gaseous form or, after absorption, in the form of an aqueous solution. In many instances, the use of chlorine dioxide solution rather than in the gaseous form is preferred. Chlorine dioxide is absorbed in water and forms chlorous acid, from which the gas can be readily expelled by heating. The presence of chlorous acid in an aqueous solution indicates a reaction of chlorine dioxide with water.

Several processes have previously been proposed for producing chlorine dioxide. Attention is thus directed to U. S. Pat. Nos. 3,684,437, 3,695,839, 3,828,097 and 3,754,079, all of which are directed to the production of chlorine dioxide or chlorous acid from which the chlorine dioxide can be expelled.

OBJECTS OF THE INVENTION

It is a primary object of the present invention to provide a simple process for the production of chlorine dioxide from readily available raw materials.

Generally, it is an object of the invention to improve on the art of chlorine dioxide production as previously practiced.

SUMMARY OF THE INVENTION

Surprisingly, it has been ascertained that chlorine dioxide is produced by subjecting an alkali metal or alkaline earth metal chlorite to ultraviolet radiation. Although chlorine dioxide is formed if the chlorite is subjected to the ultraviolet radiation in solid form, from a practical and technological point of view, the chlorite is used in an aqueous solution. The reaction is enhanced by the presence of chloride and/or hydrogen ions, the chloride is then acting as a catalyst. For this purpose, an alkali metal chloride, such as NaCL, alkaline earth metal and/or HCl may be added to the chlorite solution. No chlorine is formed by the reaction which is an additional advantage. This lowers the yield of chlorine dioxide and is, of course, undesired. The yield of chlorine dioxide obtained by exposing the chlorite solution to ultraviolet radiation is a function of the exposure time, the intensity of the radiation and the concentration of chlorite in the solution. Since chlorine dioxide ga at higher concentrations has explosive properties, the above parameters should be chosen such that its concentration in the reaction mixture does not exceed about 10%. As stated, the yield is also beneficially influenced by the presence of chloride and/or hydrogen ions.

The inventive process is advantageously carried out in situ. The chlorine dioxide formed need not be separated from the reaction mixture, but the entire reaction mixture, including the chlorine dioxide formed, may rather, in most instances, be used as a whole since the other components of the reaction do not exert a detrimental influence on the application properties. Also, the chlorine dioxide containing reaction mixture may be expelled from the reaction space and conveyed to a place of use.

A particularly advantageous feature of the present process is that the reaction parameters can be regulated easily so that chlorine dioxide free of chlorine is formed.

Although Applicant does not wish to be limited to any theories advanced by him, it is reasonable to refer to the reaction as photolysis of chlorite. It is believed that the reaction proceeds as follows:

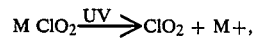

$$M\ ClO_2 \xrightarrow{UV} ClO_2 + M+,$$

wherein M is an alkali metal or alkaline earth metal.

DESCRIPTION OF THE DRAWING

The single figure of the drawing is a diagrammatic rendering of apparatus for producing chlorine dioxide in accordance with the present invention.

DETAILED DESCRIPTION OF THE DRAWING

The process may be carried out in the type of reactor shown in the drawing. The reactor comprises a tubular vessel 1 having a valve-controlled bottom inlet 2 and a valve-controlled top exit 3. The tubular vessel is made of glass, titanium or a steel alloy, such as known under the name Hastalloy C. An ultraviolet radiation source, such an one or several quartz lamps 4, is arranged within the space 5 defined by the tubular vessel 1. Although the quartz lamp is shown to have a twisted shape, it will be appreciated that other shapes, such as U-shaped quartz lamps, may also be used. The electrical connections for the quartz lamp are diagrammatically indicated by reference numeral 6. If the wall material of the tubular vessel 1 is UV radiation transmitting, the UV source may be arranged outside the vessel.

In order to enhance and contain the ultraviolet radiation emitted by the lamp, and if the reactor wall transmits UV radiation, it is advantageous to provide a shiny reflector, such as of aluminum, at the outside of the tubular vessel 1. Such a reflector is generally indicated in the drawing by reference numeral 7. The reflector may be arranged within the reaction space if it has a surface coating resistant to the reactants.

As a general proposition, the reactor wall material should be of the UV transmitting kind if the UV source is arranged outside the reactor space, but may be non-transmitting if the light source is located within the reactor space. The wall may thus be of glass, plastic, steel alloy or titanium, provided the material is resistant to the reactants. As stated, a highly polished aluminum reflector should advantageously be used to contain the intensity of the radiation in the chamber space of the reactor if the material transmits UV radiation.

The invention will now be described by several examples and experimental data, it being understood that this information is furnished by way of illustration only and not by way of limitation.

EXPERIMENTAL SERIES I:

Solid sodium chlorite was exposed to radiation from an ultraviolet light source of 4000 m watts/$cm_2$ at one inch and peak wavelength of 254nm. Chlorine dioxide was formed as indicated by spectrographic absorbance. No chlorine was detected.

EXPERIMENTAL SERIES II: PHOTOLYSIS

A. This experiment was carried out with the reactor or apparatus shown in the figure.

Space 5 of the reactor vessel 1 was flushed with oxygen, introduced through inlet 2 to replace the air atmosphere in the reactor. A 1% w/v solution of sodium chlorite in distilled water was thereafter introduced into the chamber space through inlet 2 and the quartz lamp was switched on to expose the solution to ultraviolet radiation. The radiation emitted by the lamp had a constant intensity of 4,000 m watts/$cm_2$ at 254 nanometers at 1 inch. The reference to "1 inch" indicates the distance from the center of illumination where the rated intensity is measured. The solution wa subjected to radiation. Chlorine dioxide was detected in the solution after 10 seconds of exposure to the radiation by absorbance peak and titration. No chlorine was detected. The reaction mixture within the chamber space was then expelled by flowing oxygen gas through the chamber and the expelled gas mixture was collected through the outlet 3 and analyzed for content. The analysis was effected by spectrophotometry and correlated with amphoteric titration. The presence of chlorine dioxide was again established by observing the distinct absorbance peak of chloride dioxide. The results were confirmed by titration. The procedure was repeated several times with different concentrations of chlorite in the solution to oxygen gas to determine the most favorable conditions and also to establish the range of concentrations which provides chlorine dioxide free of unreacted chlorine.

Each of the experiments was repeated several times to verify the reproducibility and correctness of the results. Additional tests were run to determine the optimum exposure time/radiation intensity (see Table I).

Additional tests were run in which observed optimum results were related to the effect of temperature and pressure on the reaction.

Constant wavelengths of 254 nanometers were maintained during the experiments without ozone producing interfering wavelengths. If desired, several lamps may be used as a UV radiation source. In one series of experiments, two lamps were used, each being rated at 20,000 m watts/$cm_2$ at 1 inch. However, it is possible to use lamps rated at 4,000 m watts/$cm_2$ or less, in which event, up to 10 or even more lamps may be used.

No free chlorine is formed and none was detected.

B. A 1% w/v solution of sodium chlorite in 0.9% aqueous sodium chloride solution (physiological) was exposed to ultraviolet radiation at 254 nm and 4,000 m watts/$cm_2$ at 1 inch. The exposure time was 1 minute. Chlorine dioxide was recovered from the solution and measured by absorbance against standard concentrations of chlorine dioxide. 0.77% w/v chlorine dioxide was recovered. The experiment was repeated and numerous replicate samples were analyzed with similar results. No chlorine was detected.

C. A 1 % w/v solution of sodium chlorite w/v was exposed to ultraviolet radiation as in experiments A and B with varying concentrations of chloride ions at 1 minute exposure, the results are shown in Table II.

D. Experiment C was repeated with an Ultraviolet source of 20,000 m watts/$cm_2$, 254nm per absorbance at 1 inch. The results were the average of replicates. Experiments C and D are shown in Table I. No chlorine was detected.

The above experiments were repeated with K and calcium chlorites with similar results.

The above experiments were repeated using greater concentrations of chlorites with similar results. These results are shown in Table III.

E. A 1% solution of sodium chlorite was exposed to ultraviolet radiation at 254 nm and 4,000 m watts/$cm_2$ at 1 inch. The solution was enhanced with hydrogen ions and chloride ions from HCl. The results of the replicate averages are shown in Table IV. The HCl content is expressed as the percentage in the final solution; the sodium chlorite percentage of the solutions is always 1%.

F. Experiment I was repeated using a filter to absorb all the visible light emitting only 254 nm radiation. The radiation source was adjusted to produce 4,000 m watts of energy at 1 inch of the absorbed light.

| % $NaClO_2$ | Exposure Time sec | Radiation UV Intens. | $Cl_2$ % | $ClO_2$ % |
|---|---|---|---|---|
| 1 | 0 | 4K | 0 | 0 |
| 1 | 5 | 4K | 0 | trace-.02 |
| 1 | 10 | 4K | 0 | .2 |
| 1 | 15 | 4K | 0 | .3 |
| 1 | 20 | 4K | 0 | .4 |
| 1 | 30 | 4K | 0 | .5 |
| 1 | 60 | 4K | 0 | .5 |
| 1 | 120 | 4K | 0 | .6 |
| 1 | 10 | 20K | 0 | .4 |
| 1 | 30 | 20K | 0 | .5 |
| 1 | 60 | 20K | 0 | .7 |

Chlorine dioxide appears after about 10 sec. exposure time to ultraviolet radiation.

Experiment II

TABLE II 1 minute exposure, 37° C., 1 atmosphere, 1% sodium chlorite solution.

| % NaCl | conc. of $ClO_2$ w/v | | Conc. of $Cl_2$ w/v) | |
|---|---|---|---|---|
| | UV 4,000 mwatts/cm | 20,000 mwatts/cm | 4,000 | 20,000 |
| 0.1 | 0.2 | 0.0 | 0 | 0 |
| 0.2 | 0.2 | 0.3 | 0 | 0 |
| 0.4 | 0.3 | 0.4 | 0 | 0 |
| 0.6 | 0.4 | 0.5 | 0 | 0 |
| 0.8 | 0.6 | 0.7 | 0 | 0 |
| 1.0 | 0.76 | 0.8 | 0 | 0 |
| 1.2 | 0.83 | 0.85 | 0 | 0 |
| 1.4 | 0.83 | 0.85 | 0 | 0 |
| 1.6 | 0.83 | 0.85 | 0 | 0 |
| 1.8 | 0.82 | 0.85 | 0 | 0 |
| 2.0 | 0.84 | 0.85 | 0 | 0 |
| 2.2 | 0.85 | 0.87 | 0 | 0 |
| 2.4 | 0.84 | 0.85 | 0 | 0 |

TABLE III 1 minute exposure, 4,000 m watts/$cm_2$. 1 atmosphere, 37° C., 1% cation solution conc.

| % NaCl | % $ClO_2$ w/v $KClO_2$ | % $ClO_2$ w/v $Ca(ClO_2)_2$ |
|---|---|---|
| 0 | 0 | 0 |
| 0.2 | 0.22 | 0.30 |
| 0.4 | 0.31 | 0.40 |
| 0.8 | 0.51 | 0.50 |

TABLE III-continued 1 minute exposure, 4,000 m watts/cm₂.
1 atmosphere,
37° C., 1% cation solution conc.

| % NaCl | % ClO₂ w/v KClO₂ | % ClO₂ w/v Ca(ClO₂)₂ |
|---|---|---|
| 1.0 | 0.60 | 0.77 |
| 1.2 | 0.60 | 0.80 |
| 1.4 | 0.62 | 0.82 |
| 1.6 | 0.65 | 0.77 |

TABLE IV 1 minute exposure, 4,000 m watts/cm₂ energy,
37° C., 1 atmosphere, 1% sodium chlorite.

| % NaCl w/v | % ClO₂ w/v at 0.05% HCl | % ClO₂ w/v at 1.5% HCl | % ClO₂ wv at 5.0% HCl |
|---|---|---|---|
| 0 | 0.17 | 0.22 | 0.42 |
| 0.2 | 0.30 | 0.40 | 0.47 |
| 0.4 | 0.35 | 0.50 | 0.69 |
| 0.6 | 0.42 | 0.57 | 0.71 |
| 0.8 | 0.58 | 0.64 | 0.78 |
| 1.0 | 0.59 | 0.68 | 0.80 |
| 1.2 | 0.60 | 0.70 | 0.81 |

PHOTOLYSIS OF CONCENTRATED CHLORITE SOLUTIONS

TABLE V

Various concentrations of sodium chlorite were subjected to 40,000 m watts/cm₂ of UV radiation. Time measurements were made to determine the exposure period to produce 80% yield of chlorine dioxide from the solution. The UV source was immersed, temperature was maintained at 37° C. and the pressure was 1 atmosphere.

| Concentration of Sodium Chlorite % | Exposure Time Necessary to produce 80% ClO₂ yield minutes (except where noted) |
|---|---|
| 1 | <5 sec. |
| 2 | <30 sec. |
| 4 | <1 |
| 6 | 1 |
| 8 | <2, <1 |
| 10 | 3 |
| 12 | 4 |
| 18 | <6, <5 |
| 20 | <6 |

TABLE VI

Time intensity graph of chlorite photolysis

| UV intensity microwatts/cm | Exposure time to produce 0.7-0.8 ClO₂ in seconds |
|---|---|
| 18,000 | <5 sec. |
| 16,000 | <5 sec. |
| 14,000 | <5 sec. |
| 12,000 | <5 sec. |
| 10,000 | <5 sec. |
| 9,000 | <5 sec. |
| 8,000 | <5 sec. |
| 7,000 | <5 sec. |
| 6,000 | 6 sec. |
| 5,000 | 8 sec. |
| 4,000 | 10 sec. |
| 3,000 | 20 sec. |
| 2,000 | 30 sec. |
| 1,000 | 60 sec. |

A 1% solution of chlorite was subjected to variant UV exposure intensity using immersion of lamp source into the solution. The time required to produce a 0.7%-0.8% solution of chlorine dioxide is recovered as an average of replicates. Temperature 37° C., 1 atmosphere pressure.

Experiment II
Advantages:
(1) Only one chemical is needed; no acids, gaseous chlorine, hypochlorites are needed.
(2) Only chlorine dioxide is produced. There is no chlorite ion, chlorine, hypochlorite, hydrogen chloride formed.
(3) No free chlorine is formed.
(4) No pH dependency of reaction.
(5) Valence change to chloride is 5, as opposed to the chlorite ion where valence change is 4 to chloride.
(6) Theoretical and practical yield is higher than any other chlorite process.
(7) Chlorine dioxide produced is in its purest form by this method from a chlorite.
(8) Chlorine dioxide can easily be displaced from the reaction with air and dissolved in water to form chlorous acid.

Observations:
Chlorine dioxide is produced by ultraviolet radiation of a chlorite solution.
Chlorine dioxide can be produced by ultraviolet radiation of a chlorite solution containing chloride ions.
Chlorine dioxide can be produced by ultraviolet radiation of a chlorite solution containing chloride and hydrogen ions.
$ClO_2$ is formed by photolysis or photo dissociation of the alkali or alkaline earth metal chlorite with the cation emitting an electron or fraction of an electron when the cation is exposed to the radiation. The shorter the wavelength the greater is the fraction of electrons that will escape after absorption.
In photo-dissociation, the electron moves away from the locale of the absorption to some region where it is unable to use its attraction to pull the nuclei together.
In the case of sodium chlorite, sodium tries to emit an electron when exposed to UV radiation.
UV radiation can be applied by either exposure to the energy source or immersion of the energy source in the solution.

What is claimed is:
1. Process of producing chlorine dioxide which comprises introducing a chlorite into a reaction space and subjecting the chlorite to ultraviolet radiation.
2. A process as claimed in claim 1, wherein the chlorite is an alkali metal or alkaline earth metal chlorite.
3. A process as claimed in claim 2, wherein said chlorite is in the form of an aqueous solution.
4. A process as claimed in claim 3, wherein the ultraviolet radiation is discontinued when the chlorine dioxide concentration in the reaction space is about 10% by weight.
5. A process as claimed in claim 3, wherein the solution also contains chloride ions.
6. A process as claimed in claim 5, wherein the chloride ions are formed from an alkali metal chloride or alkaline earth metal chloride.
7. A process as claimed in claim 3, wherein the solution also contains hydrogen ions.
8. A process as claimed in claim 7, wherein said hydrogen ions are formed from HCl added to the solution.
9. A process as claimed in claim 1 or 2, wherein the chlorine dioxide containing reaction product obtained as a result of the ultraviolet radiation is expelled from the reaction space and conveyed to a place of use.
10. A process as claimed in claim 3 or 5, wherein the chlorine dioxide reaction product obtained as result of the ultraviolet radiation is expelled from said reaction space and introduced into water to for chlorous acid.

* * * * *